(12) United States Patent
Hasegawa et al.

(10) Patent No.: US 12,170,374 B2
(45) Date of Patent: Dec. 17, 2024

(54) SECONDARY BATTERY

(71) Applicant: Kabushiki Kaisha Nihon Micronics, Tokyo (JP)

(72) Inventors: Daisuke Hasegawa, Aomori (JP); Kazuyuki Tsunokuni, Tokyo (JP); Tomokazu Saito, Aomori (JP); Taku Higuti, Aomori (JP)

(73) Assignee: Kabushiki Kaisha Nihon Micronics, Musashino (JP)

( * ) Notice: Subject to any disclaimer, the term of this patent is extended or adjusted under 35 U.S.C. 154(b) by 593 days.

(21) Appl. No.: 17/384,669

(22) Filed: Jul. 23, 2021

(65) Prior Publication Data

US 2021/0351412 A1   Nov. 11, 2021

Related U.S. Application Data

(63) Continuation of application No. PCT/JP2020/001464, filed on Jan. 17, 2020.

(30) Foreign Application Priority Data

Jan. 31, 2019   (JP) .................................. 2019-015214

(51) Int. Cl.
*H01M 4/62*   (2006.01)
*H01M 4/48*   (2010.01)
(Continued)

(52) U.S. Cl.
CPC ........... *H01M 4/628* (2013.01); *H01M 4/483* (2013.01); *H01M 4/523* (2013.01); *H01M 10/0562* (2013.01); *H01M 2300/0071* (2013.01)

(58) Field of Classification Search
CPC ...... H01M 4/628; H01M 4/483; H01M 4/523; H01M 4/525; H01M 4/485; H01M 10/0562; H01M 2300/0071
(Continued)

(56) References Cited

U.S. PATENT DOCUMENTS 8,587,855 B2   11/2013   Nakazawa
9,887,441 B2   2/2018   Nakazawa
(Continued)

FOREIGN PATENT DOCUMENTS

EP   3754776 A1   12/2020
JP   5297809 B2   9/2013
(Continued)

OTHER PUBLICATIONS

Chen et al., Constructing Hierarchical Spheres from Large Ultrathin Anatase TiO2 Nanosheets with Nearly 100% Exposed (001) Facets for Fast Reversible Lithium Storage), Apr. 14, 2010, JACS, 132, pp. 6129 and 6130 (Year: 2010).*
(Continued)

*Primary Examiner* — James M Erwin
*Assistant Examiner* — John S Medley
(74) *Attorney, Agent, or Firm* — Lorenz & Kopf, LLP

(57) ABSTRACT

A secondary battery includes: a solid electrolyte layer which contains a tantalum oxide as a solid electrolyte; a positive-electrode active material layer which is disposed on an upper surface of the solid electrolyte layer and contains a nickel hydroxide ($Ni(OH)_2$) as a positive-electrode active material; and a negative-electrode active material layer disposed on a lower surface of the solid electrolyte layer so as to be opposite to the positive-electrode active material layer and containing a titanium oxide ($TiO_x$) or a titanium oxide ($TiO_x$) and a silicon oxide ($SiO_x$) as a negative-electrode active material. There is provided a secondary battery
(Continued)

capable of improving electricity storage performance by improving a self-discharge.

12 Claims, 11 Drawing Sheets

(51) Int. Cl.
*H01M 4/52* (2010.01)
*H01M 10/0562* (2010.01)

(58) Field of Classification Search
USPC ........................................................ 429/304
See application file for complete search history.

(56) References Cited

U.S. PATENT DOCUMENTS

| | | | |
|---|---|---|---|
| 2010/0273056 A1 | 10/2010 | Kanda et al. | |
| 2013/0026409 A1 | 1/2013 | Baker et al. | |
| 2013/0224596 A1* | 8/2013 | Nakazawa | H01M 14/00 |
| | | | 429/231 |
| 2014/0057162 A1* | 2/2014 | Schneider | C03C 10/0027 |
| | | | 429/188 |
| 2017/0271649 A1* | 9/2017 | Vereecken | H01M 4/364 |
| 2018/0006293 A1* | 1/2018 | Demaray | H01M 10/052 |
| 2018/0062212 A1* | 3/2018 | Kim | H01M 4/505 |
| 2019/0280330 A1* | 9/2019 | Albano | H01M 10/0562 |
| 2020/0006009 A1 | 1/2020 | Tonokawa et al. | |
| 2020/0313180 A1* | 10/2020 | Ryoshi | H01M 4/505 |

FOREIGN PATENT DOCUMENTS

| | | | | |
|---|---|---|---|---|
| JP | 5508542 B2 | | 6/2014 | |
| JP | 2015082445 A | * | 4/2015 | ............ H01M 10/36 |
| JP | 2016082125 A | | 5/2016 | |
| JP | 2017147186 A | | 8/2017 | |
| TW | 201304240 A | | 1/2013 | |
| WO | WO2009063747 A1 | | 3/2011 | |
| WO | WO-2018089430 A1 | * | 5/2018 | ............ B01J 6/008 |
| WO | WO2018168494 A1 | | 9/2018 | |
| WO | WO2019159773 A1 | | 8/2019 | |

OTHER PUBLICATIONS

European Patent Office, European Search Report, Nov. 9, 2022, Application No. PCT/JP2020/001464, Kabushiki Kaisha Nihon Micronics.

* cited by examiner

| | SiO$_2$ | Al$_2$O$_3$ | SiOx+SnO | Ta$_2$O$_5$ | Ta$_2$O$_5$/SiOx |
|---|---|---|---|---|---|
| IONIC CONDUCTIVITY | 2.4~5.7e-9 S/cm$^2$ | 9.9~8.2e-10 S/cm$^2$ | 3.0e-7 S/cm$^2$ | 5.8e-6 S/cm$^2$ | 2.0e-7 S/cm$^2$ |

FIG. 13

|  | STRUCTURE 1 | STRUCTURE 2 | STRUCTURE 3 | STRUCTURE 4 |
|---|---|---|---|---|
|  | $SiO_x+SnO$ | $Ta_2O_5$ | $Ta_2O_5/SiO_x+SnO$ | $Ta_2O_5/SiO_x$ |
| SELF-DISCHARGE RESIDUAL RATE AFTER LEAVING FOR A CERTAIN PERIOD OF TIME | 10% | 0% | 33% | 60% |

FIG. 14

|  | STRUCTURE 4 | STRUCTURE 5 | STRUCTURE 1 | STRUCTURE 6 |
|---|---|---|---|---|
| DISCHARGE CAPACITY (a.u.) | 0.83 | 0.33 | 1.00 | 1.17 |
| SELF-DISCHARGE RESIDUAL RATE AFTER LEAVING FOR A CERTAIN PERIOD OF TIME | 60% | 0% | 10% | 0% |

SECONDARY BATTERY

CROSS-REFERENCE TO RELATED APPLICATIONS

This application is a continuation of international patent application number PCT/JP2020/001464, having an international filing date of Jan. 17, 2020, which claims priority to Japan patent application number P2019-015214, having a filing date of Jan. 31, 2019. The content of the referenced applications is incorporated by reference herein.

FIELD

The embodiments described herein relate to a secondary battery.

BACKGROUND

As conventional secondary batteries, there have been proposed secondary batteries, in which a first electrode/an insulating material/an n type oxide semiconductor layer/a p type oxide semiconductor layer/a second electrode are layered, since electrolytic solutions are not used and thinning thereof can be realized.

Moreover, as a structure similar to such secondary batteries, there have been proposed secondary batteries including: a positive electrode including a positive-electrode active material layer containing a nickel oxide or the like as a positive-electrode active material; a solid electrolyte having an aqueous porous structure; and a negative electrode including a negative-electrode active material layer containing a titanium oxide or the like as a negative-electrode active material.

Furthermore, there have also been proposed secondary batteries including a nickel oxide as a positive-electrode active material, a titanium oxide formed by sputtering as a negative-electrode active material, and a silicon oxide to which a metallic oxide is added as a solid electrolyte.

For example, as materials of the solid electrolyte, a silicon dioxide ($SiO_2$), an aluminium oxide ($Al_2O_3$), and the like which are materials having characteristics of hygroscopic property or a hydrate have been used, and metals, such as tin (Sn) and titanium (Ti), have been further added in order to the above-mentioned oxide solid electrolyte to adjust electrical conductivity and layer thickness thereof.

SUMMARY

The embodiments provide a secondary battery capable of improving electricity storage performance by improving a self-discharge.

According to one aspect of the embodiments, there is provided a secondary battery comprising: a solid electrolyte layer containing a tantalum oxide as a solid electrolyte; a positive-electrode active material layer disposed on an upper surface of the solid electrolyte layer, the positive-electrode active material layer containing nickel hydroxide ($Ni(OH)_2$) as a positive-electrode active material; and a negative-electrode active material layer disposed on a lower surface of the solid electrolyte layer so as to be opposite to the positive-electrode active material layer, the negative-electrode active material layer containing a titanium oxide ($TiO_x$) or containing a titanium oxide ($TiO_x$) and a silicon oxide (SiO) as a negative-electrode active material.

According to another aspect of the embodiments, there is provided a secondary battery, wherein a buffer layer for improving an interface is formed between the positive-electrode active material layer and the solid electrolyte layer.

According to still another aspect of the embodiments, there is provided a secondary battery, wherein a buffer layer for improving an interface is formed between the positive-electrode active material layer and the solid electrolyte layer and/or between the negative-electrode active material layer and the solid electrolyte layer.

According to the embodiments, there can be provided the secondary battery capable of improving the electricity storage performance by improving the self-discharge.

BRIEF DESCRIPTION OF THE DRAWINGS

FIG. 13 illustrates a diagram illustrating an example (comparison) of a self-discharge residual rate for a structure of the secondary battery of each of the structures 1 to 4.

FIG. 14 illustrates a diagram illustrating an example (comparison) of a discharge capacity and a self-discharge residual rate for a structure of each secondary battery of the structures 4, 5, 1, and 6.

DESCRIPTION OF EMBODIMENTS

Next, the embodiments will be described with reference to drawings. In the description of the following drawings, the identical or similar reference sign is attached to the identical or similar part. However, it should be noted that the drawings are schematic and therefore the relation between thickness and the plane size and the ratio of the thickness differs from an actual thing. Therefore, detailed thickness and size should be determined in consideration of the following explanation. Of course, the part from which the relation and ratio of a mutual size differ also in mutually drawings is included.

Moreover, the embodiments illustrated hereinafter exemplify the apparatus and method for materializing the technical idea; and the embodiments do not specify the material, shape, structure, placement, etc. of each component part as the following. The embodiments may be changed without departing from the spirit or scope of claims.

In explanation of following embodiments, a first conductivity type means an n type and a second conductivity type means a p type opposite to the first conductivity type, for example.

Next, certain embodiments will now be described with reference to drawings. In the description of the following drawings to be explained, the identical or similar reference sign is attached to the identical or similar part. However, it should be noted that the drawings are schematic and the relation between thickness and the plane size and the ratio of the thickness of each component part differs from an actual thing. Therefore, detailed thickness and size should be determined in consideration of the following explanation. Of course, the part from which the relation and ratio of a mutual size differ also in mutually drawings is included.

Moreover, the embodiments described hereinafter merely exemplify the device and method for materializing the technical idea; and the embodiments do not specify the material, shape, structure, placement, etc. of each component part as the following. The embodiments may be changed without departing from the spirit or scope of claims.

In the embodiments illustrated hereinafter, the n type oxide semiconductor layer is abbreviated as an n type semiconductor layer, and the p type oxide semiconductor layer is abbreviated as a p type semiconductor layer, to be explained.

In the following description, the expression $Ta_2O_5$ shall include a tantalum pentoxide and an oxygen-deficient tantalum oxide $Ta_2O_{4-5}$.

First Embodiment

Figure 1:
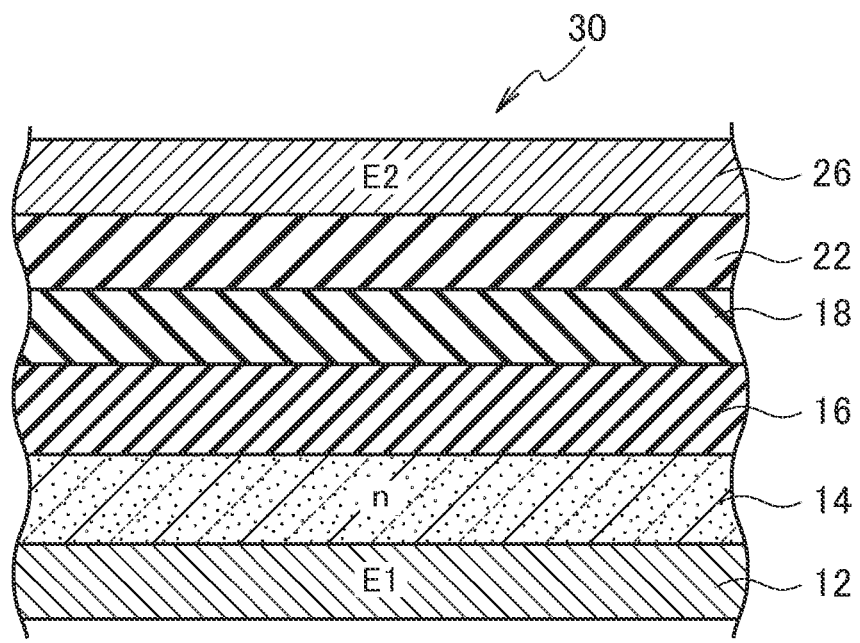
FIG. 1 is a schematic cross-sectional structure diagram illustrating a secondary battery according to a first embodiment.

FIG. 1 illustrates a schematic cross-sectional structure of a secondary battery 30 according to a first embodiment. The secondary battery 30 according to the first embodiment includes a configuration including a first electrode (E1) (negative electrode) 12/an n type semiconductor layer 14/a negative-electrode active material layer 16/a solid electrolyte layer 18/a positive-electrode active material layer 22/a second electrode (E2) (positive electrode) 26.

As illustrated in FIG. 1, the secondary battery 30 according to the first embodiment includes: a solid electrolyte layer 18 containing a tantalum oxide including at least one of water ($H_2O$) and a hydroxyl group (—OH) as a solid electrolyte; a positive-electrode active material layer 22 disposed on an upper surface of the solid electrolyte layer 18 and containing nickel hydroxide ($Ni(OH)_2$) as a positive-electrode active material; a second electrode (positive electrode) 26 disposed on an upper surface of the positive-electrode active material layer 22; a negative-electrode active material layer 16 disposed on a lower surface of the solid electrolyte layer 18 so as to be opposite to the positive-electrode active material layer 22, and containing a titanium oxide ($TiO_x$) including at least one of water ($H_2O$) and a hydroxyl group (—OH) as a negative-electrode active material; and a first electrode (negative electrode) 12 disposed on a lower surface of the negative-electrode active material layer 16 so as to be opposite to the second electrode (positive electrode) 26.

In this case, by increasing an ionic conductivity of the solid electrolyte of the solid electrolyte layer 18, an internal electrical resistance of the secondary battery 30 is decreased, and charge/discharge efficiency is improved. In order to increase the ionic conductivity of the solid electrolyte layer 18, it is required to decrease an interface resistance between the active material of the positive-electrode active material layer 22 or negative-electrode active material layer 16 and the electrolyte. The active material of the positive-electrode active material layer 22 or negative-electrode active material layer 16 is a material directly involved in a transfer of electrons. In the example illustrated in FIG. 1, the active material of the positive-electrode active material layer 22 is $Ni(OH)_2$, and the active material of the negative-electrode active material layer 16 is $TiO_x$.

Moreover, in order to suppress a self-discharge, it is required to eliminate an electron leakage of the solid electrolyte of the solid electrolyte layer 18 (to increase electron insulation).

In comparative examples (solid electrolyte layer 18SS of the structure 1 illustrated in FIG. 8A or the structure 6 illustrated in FIG. 8F) described later, by adding a metal, such as Sn and Ti, to the oxide solid electrolyte of $SiO_x$ to increase the ionic conductivity, and a layer thickness of the solid electrolyte layer 18SS is formed to be thicker. The reason for increasing the layer thickness is to prevent the self-discharge (prevent the electron leakage) and to maintain reliability of a layer in which a probability of short-circuiting is reduced.

However, there is a problem that, if such the metal, such as Sn or Ti, is added to the oxide solid electrolyte, electron conductivity occurs and thereby retention of an electricity storage capacity is deteriorated.

Since the $SiO_2$ and $Al_2O_3$ as the solid electrolyte have high electron insulation but have low ionic conductivity, it is required to form a layer thickness of the solid electrolyte layer 18SS to be thinner in order to obtain required charge/discharge characteristics. Since the ionic conductivity can be increased if the layer thickness of the solid electrolyte is decreased, the charge/discharge characteristics can be obtained. However, as the layer thickness becomes thinner, the reliability of the layer is decreased, such as the probability of short-circuiting is increased, and there are concerns about degradation in fabricating stability and cycle characteristics.

Therefore, the present embodiments have adopted $Ta_2O_5$ having higher ionic conductivity than that of $SiO_2$ and $Al_2O_3$, as the solid electrolyte contained in the solid electrolyte layer 18.

Alternatively, as described below, in order to smooth the transfer of electric charge between the positive-electrode active material layer 22 and the solid electrolyte layer 18, a $SiO_2$-based buffer layer 19 (refer to FIG. 3 and the like) may be inserted therebetween to improve the interface therebetween. Since the internal electrical resistance between the solid electrolyte layer 18 ($Ta_2O_5$) and the positive-electrode active material layer 22 ($Ni(OH)_2$) is relatively high, it is possible that the transfer of the electric charge cannot be smoothly performed. Therefore, the transfer of electric charge is improved by inserting the buffer layer 19 based on $SiO_2$ having a proven record of electric discharge between the positive-electrode active material layer 22 and the solid electrolyte layer 18.

The positive-electrode active material layer 22 can formed by directly forming the nickel hydroxide ($Ni(OH)_2$) as a film. Although a nickel oxide (NiO) can also be applied in addition to the nickel hydroxide as the positive-electrode active material of the positive-electrode active material layer 22, in that case, a process for electrically changing a part of the nickel oxides (NiO) to the nickel hydroxide ($Ni(OH)_2$) is required.

The positive-electrode active material layer 22 may include a nickel oxide (NiO), metallic nickel (Ni), a cobalt hydroxide ($Co(OH)_2$), or the like.

The positive-electrode active material layer 22 includes at least the nickel hydroxide ($Ni(OH)_2$), and includes a structure in which at least one selected from the group consisting of a proton, a hydroxide ion (OH—), and a hydronium ion ($H_3O+$) can be transferred, and has a change in valence of nickel atoms during charge and discharge.

The negative-electrode active material layer 16 includes a titanium oxide compound ($TiO_x$) including at least one of water ($H_2O$) and a hydroxyl group (—OH) or the titanium oxide compound ($TiO_x$) and a silicon oxide ($SiO_x$); and includes a structure in which at least one selected from the group consisting of a proton, a hydroxide ion (OH—), and a hydronium ion ($H_3O+$) can be transferred, and has a change in valence of titanium atoms during the charge and discharge.

The above-mentioned titanium oxide compound may be formed by coating and firing titanium fatty acid.

The above-mentioned titanium oxide compound may include a mixture of trivalent and tetravalent titanium atoms, and may further include water ($H_2O$) or a hydroxyl group (—OH) around the titanium atoms. Furthermore, the above-mentioned titanium oxide compound may include an amorphous structure or a micro crystallite structure.

It is also possible to form a high resistivity layer or insulation layer with respect to electrons, maintaining the transfer of ion by optimizing a film thickness of the solid electrolyte layer 18 and the amount of the metallic oxide to be added.

The n type semiconductor layer 14 is a titanium oxide (IV) including at least one of a rutile type or anatase type crystal structure. The n type semiconductor layer 14 is preferable to include at least one crystal structure of the rutile type crystal structure and the anatase type crystal structure, and to have a metal oxide semiconductor containing a small amount of water ($H_2O$) or a small amount of hydroxyl group (—OH).

The second electrode (positive electrode) may include Al, Ti, ITO, or Ni.

The first electrode (negative electrode) may include W, Ti, or ITO.

The positive-electrode active material layer 22 may be formed by depositing a nickel hydroxide through a wet process.

Structural Example of Negative-Electrode Active Material Layer, Solid Electrolyte Layer, and Positive-Electrode Active Material Layer FIGS. 2 to 7 each illustrates a schematic cross-sectional structure of a portion of the negative-electrode active material layer 16, the solid electrolyte layer 18, and the positive-electrode active material layer 22, in the schematic cross-sectional structure of the secondary battery 30 illustrated in FIG. 1.

Figure 2A:
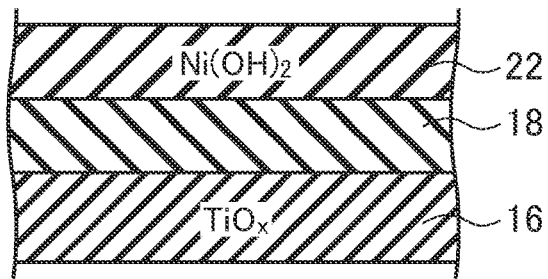
FIG. 2A illustrates, in a schematic cross-sectional structure diagram illustrating a portions of a negative-electrode active material layer, a solid electrolyte layer, and a positive-electrode active material layer, in the schematic cross-sectional structure of the secondary battery illustrated in FIG. 1, an example of the negative-electrode active material layer containing $TiO_x$ and the positive-electrode active material layer containing $Ni(OH)_2$.

A secondary battery 30 illustrated in FIG. 2A includes: a solid electrolyte layer 18 containing $Ta_2O_5$ as a solid electrolyte; a positive-electrode active material layer 22 disposed on an upper surface of the solid electrolyte layer 18 and containing $Ni(OH)_2$ as a positive-electrode active material; and a negative-electrode active material layer 16 disposed on a lower surface of the solid electrolyte layer 18 so as to be opposite to the positive-electrode active material layer 22, and containing $TiO_x$ as a negative-electrode active material.

Figure 2B:
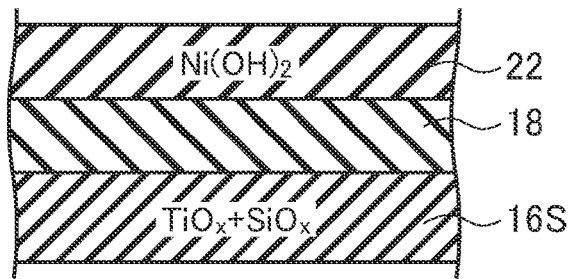
FIG. 2B illustrates, in a schematic cross-sectional structure diagram illustrating a portions of a negative-electrode active material layer, a solid electrolyte layer, and a positive-electrode active material layer, in the schematic cross-sectional structure of the secondary battery illustrated in FIG. 1, an example of the negative-electrode active material layer containing $TiO_x$ and $SiO_x$ and the positive-electrode active material layer containing $Ni(OH)_2$.

Moreover, a secondary battery 30 illustrated in FIG. 2B includes: a solid electrolyte layer 18 containing $Ta_2O_5$ as a solid electrolyte; a positive-electrode active material layer 22 disposed on an upper surface of the solid electrolyte layer 18 and containing $Ni(OH)_2$ as a positive-electrode active material; and A negative-electrode active material layer 16S disposed on a lower surface of the solid electrolyte layer 18 so as to be opposite to the positive-electrode active material layer 22, and containing $TiO_x$ and $SiO_x$ as a negative-electrode active material.

FIGS. 3 to 5 each illustrates an example of inserting a buffer layer for improving an interface 19 between the positive-electrode active material layer 22 and the solid electrolyte layer 18, or an example of inserting a buffer layer for improving an interface 17 between the negative-electrode active material layer 16 and the solid electrolyte layer 18. The buffer layers 17 and 19 are formed to contain a silicon oxide ($SiO_x$), for example.

Figure 3A:
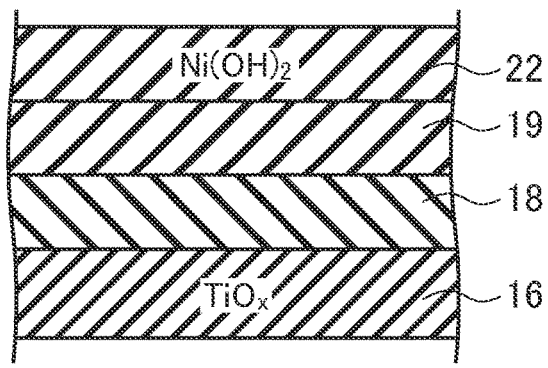
FIG. 3A illustrates, in a schematic cross-sectional structure diagram illustrating an example of inserting a buffer layer between the positive-electrode active material layer and the solid electrolyte layer, in the schematic cross-sectional structure of the secondary battery illustrated in FIG. 2, an example of the negative-electrode active material layer containing $TiO_x$ and the positive-electrode active material layer containing $Ni(OH)_2$.
Figure 3B:
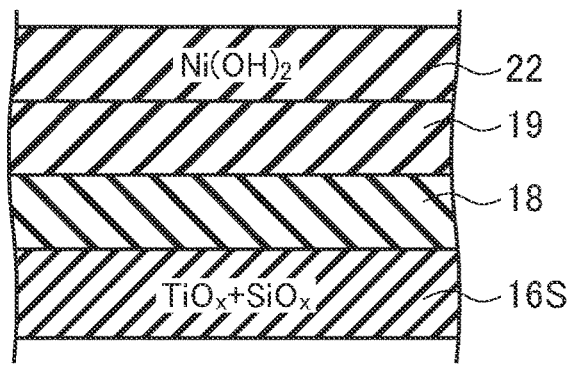
FIG. 3B illustrates, in a schematic cross-sectional structure diagram illustrating an example of inserting a buffer layer between the positive-electrode active material layer and the solid electrolyte layer, in the schematic cross-sectional structure of the secondary battery illustrated in FIG. 2, an example of the negative-electrode active material layer containing $TiO_x$ and $SiO_x$ and the positive-electrode active material layer containing $Ni(OH)_2$.

FIG. 3A illustrates an example of inserting the buffer layer for improving an interface 19 between the positive-electrode active material layer 22 and the solid electrolyte layer 18, in the secondary battery 30 illustrated in FIG. 2A. FIG. 3B illustrates an example of inserting the buffer layer for improving an interface 19 between the positive-electrode active material layer 22 and the solid electrolyte layer 18, in the secondary battery 30 illustrated in FIG. 2B.

Figure 4A:
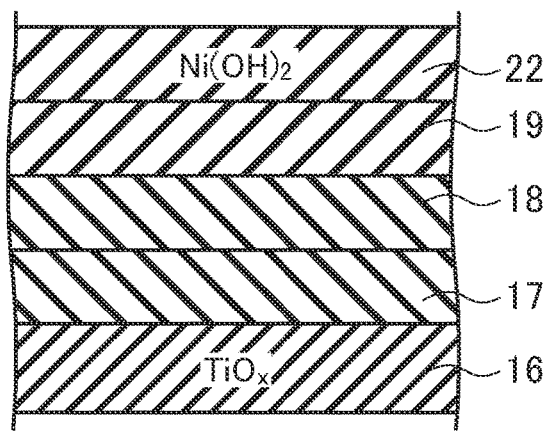
FIG. 4A illustrates, in a schematic cross-sectional structure diagram illustrating an example of inserting a buffer layer also between the negative-electrode active material layer and the solid electrolyte layer, in the schematic cross-sectional structure of the secondary battery illustrated in FIG. 3, an example of the negative-electrode active material layer containing $TiO_x$ and the positive-electrode active material layer containing $Ni(OH)_2$.
Figure 4B:
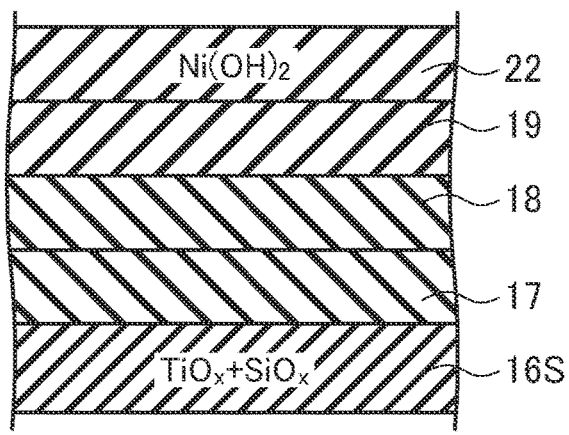
FIG. 4B illustrates, in a schematic cross-sectional structure diagram illustrating an example of inserting a buffer layer also between the negative-electrode active material layer and the solid electrolyte layer, in the schematic cross-sectional structure of the secondary battery illustrated in FIG. 3, an example of the negative-electrode active material layer containing $TiO_x$ and $SiO_x$ and the positive-electrode active material layer containing $Ni(OH)_2$.

FIG. 4A illustrates an example of inserting the buffer layer for improving an interface 17 also between the negative-electrode active material layer 16 and the solid electrolyte layer 18, in the secondary battery 30 illustrated in FIG. 3A. FIG. 4B illustrates an example of inserting the buffer layer for improving an interface 17 also between the negative-electrode active material layer 16S and the solid electrolyte layer 18, in the secondary battery 30 illustrated in FIG. 3B.

Figure 5A:
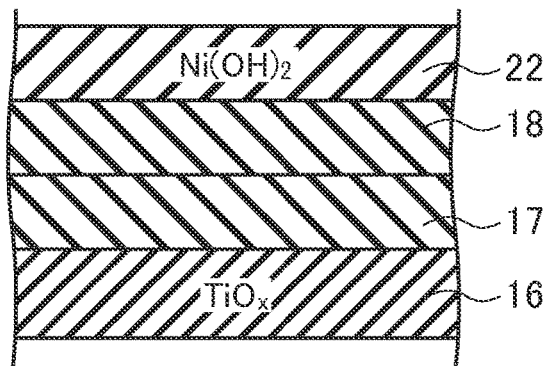
FIG. 5A illustrates, in a schematic cross-sectional structure diagram illustrating an example of inserting a buffer layer between the negative-electrode active material layer and the solid electrolyte layer, in the schematic cross-sectional structure of the secondary battery illustrated in FIG. 2, an example of the negative-electrode active material layer containing $TiO_x$ and the positive-electrode active material layer containing $Ni(OH)_2$.
Figure 5B:
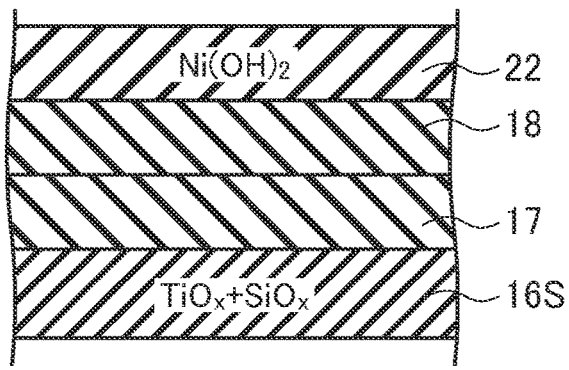
FIG. 5B illustrates, in a schematic cross-sectional structure diagram illustrating an example of inserting a buffer layer between the negative-electrode active material layer and the solid electrolyte layer, in the schematic cross-sectional structure of the secondary battery illustrated in FIG. 2, an example of the negative-electrode active material layer containing $TiO_x$ and $SiO_x$ and the positive-electrode active material layer containing $Ni(OH)_2$.

FIG. 5A illustrates an example of inserting the buffer layer for improving an interface 17 between the negative-electrode active material layer 16 and the solid electrolyte layer 18, in the secondary battery 30 illustrated in FIG. 2A. FIG. 5B illustrates an example of inserting the buffer layer for improving an interface 17 between the negative-electrode active material layer 16S and the solid electrolyte layer 18, in the secondary battery 30 illustrated in FIG. 2B.

FIG. 6 illustrates an example of inserting a buffer layer for improving an interface (metallic oxide-containing buffer layer) 19MO containing a metallic oxide between the positive-electrode active material layer 22 and the solid electrolyte layer 18, or an example of inserting a buffer layer for improving an interface (metallic oxide-containing buffer layer) 17MO containing a metallic oxide between the negative-electrode active material layer 16 and the solid electrolyte layer 18. The metallic oxide-containing buffer layers 17MO and 19MO are formed to include a silicon oxide ($SiO_x$) containing a metallic oxide. As the metallic oxide contained in the metallic oxide-containing buffer layers 17MO and 19MO, a tin oxide (SnO), an aluminium oxide ($Al_2O_3$), zirconia ($ZrO_2$), a magnesium oxide (MgO), a phosphorus oxide ($P_xO_y$), or the like can be applied.

Figure 6A:
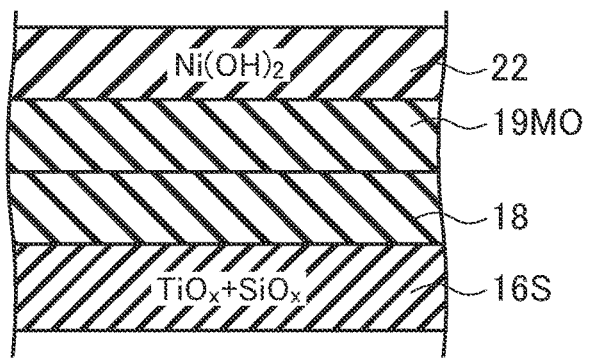
FIG. 6A illustrates, in the schematic cross-sectional structure of the secondary battery illustrated in FIG. 2, an example of inserting a buffer layer containing a metallic oxide between the positive-electrode active material layer and the solid electrolyte layer, the negative-electrode active material layer containing $TiO_x$, and the positive-electrode active material layer containing $Ni(OH)_2$.
Figure 6B:
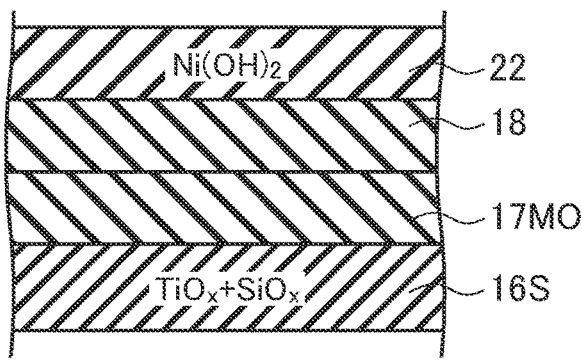
FIG. 6B illustrates, in the schematic cross-sectional structure of the secondary battery illustrated in FIG. 2, an example of inserting a buffer layer containing a metallic oxide further between the negative-electrode active material layer and the solid electrolyte layer, the negative-electrode active material layer containing $TiO_x$ and $SiO_x$, and the positive-electrode active material layer containing $Ni(OH)_2$.

FIG. 6A illustrates an example of inserting the metallic oxide-containing buffer layer 19MO for improving the interface between the positive-electrode active material layer 22 and the solid electrolyte layer 18, in the secondary battery 30 illustrated in FIG. 2B. FIG. 6B illustrates an example of inserting the metallic oxide-containing buffer layer 17MO for improving the interface between the negative-electrode active material layer 16S and the solid electrolyte layer 18, in the secondary battery 30 illustrated in FIG. 2B. Alternatively, the negative-electrode active material layers 16S ($TiO_x+SiO_x$) illustrated in each of FIGS. 6B and 6B may be replaced by the negative-electrode active material layer 16 ($TiO_x$).

FIG. 7 illustrates an example of a positive-electrode active material layer 22S containing $SiO_x$ (buffer layer material) inside thereof and a negative-electrode active material layer 16S containing $SiO_x$ (buffer layer material) inside thereof.

Figure 7A:
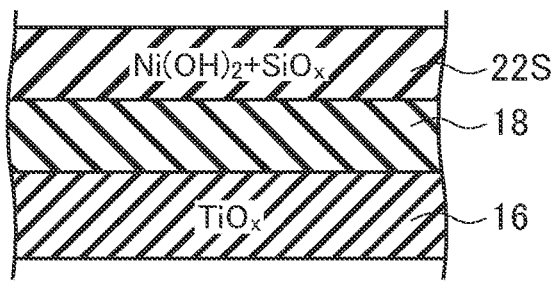
FIG. 7A illustrates, in a schematic cross-sectional structure diagram illustrating a portions of a negative-electrode active material layer, a solid electrolyte layer, and a positive-electrode active material layer, in the schematic cross-sectional structure of the secondary battery illustrated in FIG. 1, an example of the negative-electrode active material layer containing $TiO_x$ and the positive-electrode active material layer containing $Ni(OH)_2$ and $SiO_x$.

A secondary battery 30 illustrated in FIG. 7A includes: a solid electrolyte layer 18 containing $Ta_2O_5$ as a solid electrolyte; a positive-electrode active material layer 22S disposed on an upper surface of the solid electrolyte layer 18, and containing $Ni(OH)_2$ as a positive-electrode active material and containing $SiO_x$ as a buffer layer material; and a negative-electrode active material layer 16 disposed on a lower surface of the solid electrolyte layer 18 so as to be opposite to the positive-electrode active material layer 22S, and containing $TiO_x$ as a negative-electrode active material.

Figure 7B:
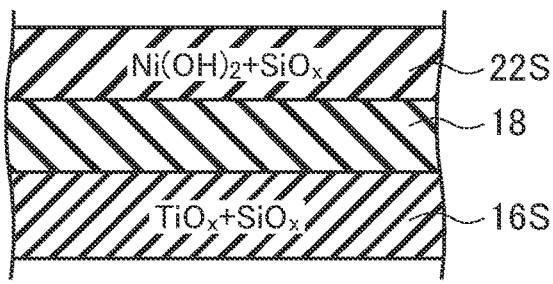
FIG. 7B illustrates, in a schematic cross-sectional structure diagram illustrating a portions of a negative-electrode active material layer, a solid electrolyte layer, and a positive-electrode active material layer, in the schematic cross-sectional structure of the secondary battery illustrated in FIG. 1, an example of the negative-electrode active material layer containing $TiO_x$ and $SiO_x$ and the positive-electrode active material layer containing $Ni(OH)_2$ and $SiO_x$.

A secondary battery 30 illustrated in FIG. 7B includes: a solid electrolyte layer 18 containing $Ta_2O_5$ as a solid electrolyte; a positive-electrode active material layer 22S disposed on an upper surface of the solid electrolyte layer 18, and containing $Ni(OH)_2$ as a positive-electrode active material and containing $SiO_x$ as a buffer layer material; and a negative-electrode active material layer 16S dispose on a lower surface of the solid electrolyte layer 18 so as to be opposite to the positive-electrode active material layer 22S, and containing $TiO_x$ as a negative-electrode active material and containing $SiO_x$ as a buffer layer material.

According to the secondary batteries 30 according to the embodiments illustrated in FIGS. 2 to 7, electricity storage performance can be improved by improving the self-discharge.

According to the secondary batteries 30 according to the embodiments illustrated in FIGS. 3 to 7, the transfer of electric charge between the positive-electrode active material layer 22 and the solid electrolyte layer 18 or the transfer of electric charge between the negative-electrode active material layer 16 and the solid electrolyte layer 18 can be improved, and thereby the electricity storage performance can further be improved.

Comparison of Each Secondary Battery Structure

Figure 8A:
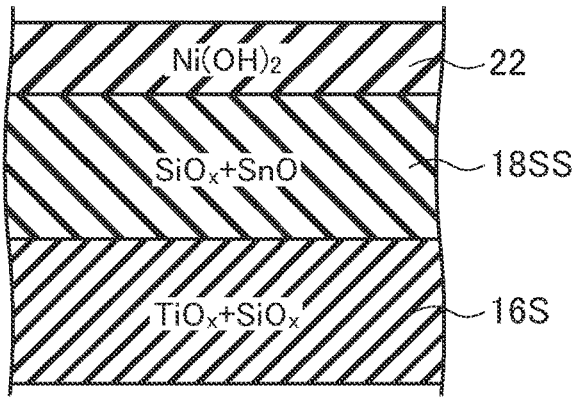
FIG. 8A illustrates, in a partial schematic cross-sectional structure of a secondary battery used in order to verify an effect of the secondary battery according to the embodiments, a structure 1 (comparative example).
Figure 8B:
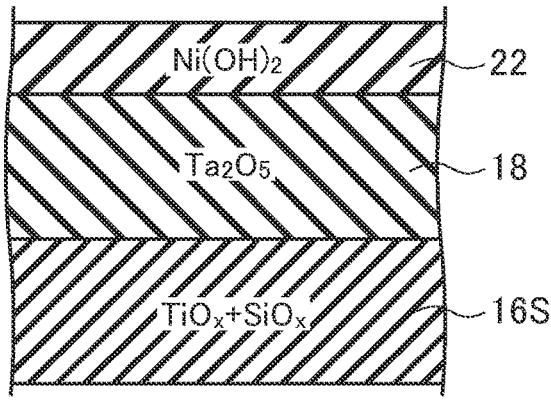
FIG. 8B illustrates, in a partial schematic cross-sectional structure of a secondary battery used in order to verify an effect of the secondary battery according to the embodiments, a structure 2 (working example).
Figure 8C:
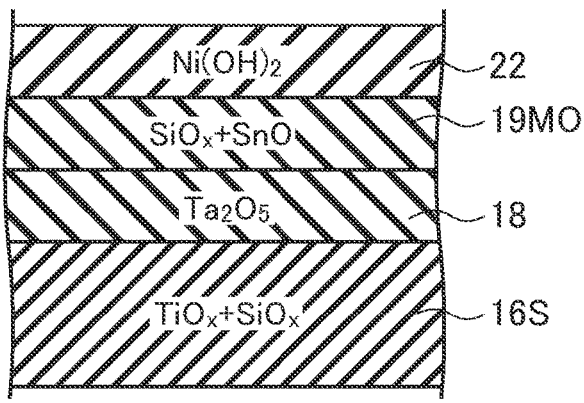
FIG. 8C illustrates, in a partial schematic cross-sectional structure of a secondary battery used in order to verify an effect of the secondary battery according to the embodiments, a structure 3 (working example).
Figure 8D:
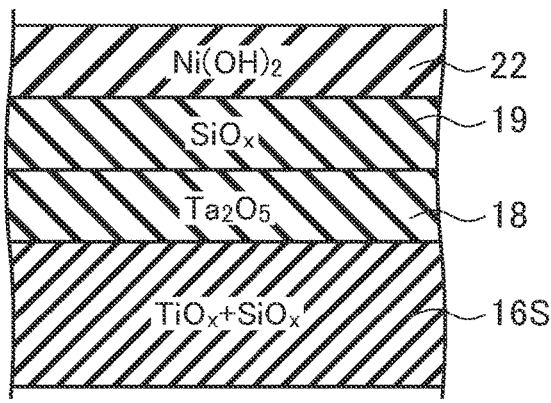
FIG. 8D illustrates, in a partial schematic cross-sectional structure of a secondary battery used in order to verify an effect of the secondary battery according to the embodiments, a structure 4 (working example).
Figure 8E:
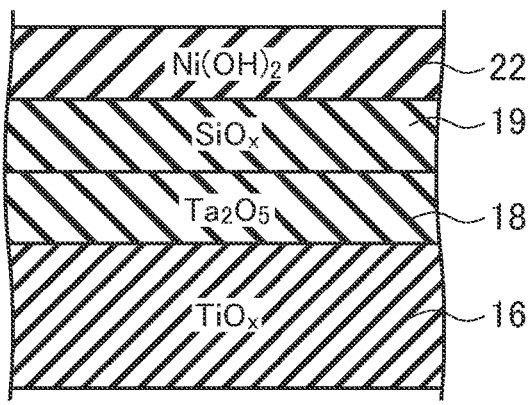
FIG. 8E illustrates, in a partial schematic cross-sectional structure of a secondary battery used in order to verify an effect of the secondary battery according to the embodiments, a structure 5 (working example).
Figure 8F:
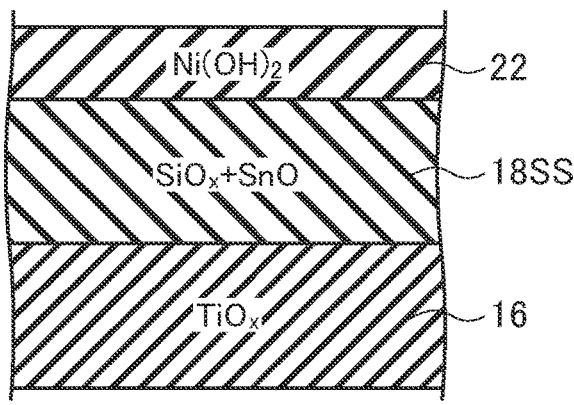
FIG. 8F illustrates, in a partial schematic cross-sectional structure of a secondary battery used in order to verify an effect of the secondary battery according to the embodiments, a structure 6 (comparative example).

FIGS. 8A to 8F each illustrates a partial schematic cross-sectional structure of a secondary battery used in order to verify an effect of the secondary battery 30 according to the embodiments. FIG. 8A illustrates a structure 1 (comparative example), FIG. 8B illustrates a structure 2 (working example), FIG. 8C illustrates a structure 3 (working example), FIG. 8D illustrates a structure 4 (working example), FIG. 8E illustrates a structure 5 (working example), and FIG. 8F illustrates a structure 6 (comparative example).

FIG. 8A illustrates the structure 1 (comparative example) of the secondary battery 30. The structure 1 includes: a solid electrolyte layer 18SS containing $SiO_x$ and SnO as a solid electrolyte; a positive-electrode active material layer 22 disposed on an upper surface of the solid electrolyte layer 18SS and containing $Ni(OH)_2$ as a positive-electrode active material; and a negative-electrode active material layer 16S disposed on a lower surface of the solid electrolyte layer 18 so as to be opposite to the positive-electrode active material layer 22, and containing TiO and $SiO_x$ as a negative-electrode active material.

FIG. 8B illustrates the structure 2 (working example) of the secondary battery 30 (corresponding to the structure illustrated in FIG. 2B). The structure 2 includes: a solid electrolyte layer 18 containing $Ta_2O_5$ as a solid electrolyte; a positive-electrode active material layer 22 disposed on an upper surface of the solid electrolyte layer 18 and containing $Ni(OH)_2$ as a positive-electrode active material; and a negative-electrode active material layer 16S disposed on a lower surface of the solid electrolyte layer 18 so as to be opposite to the positive-electrode active material layer 22, and containing TiO and $SiO_x$ as a negative-electrode active material.

FIG. 8C illustrates the structure 3 (working example) of the secondary battery 30 (corresponding to the structure illustrated in FIG. 6A). The structure 3 includes: a solid electrolyte layer 18 containing $Ta_2O_5$ as a solid electrolyte; a positive-electrode active material layer 22 disposed on an upper surface of the solid electrolyte layer 18 and containing $Ni(OH)_2$ as a positive-electrode active material; and a negative-electrode active material layer 16S disposed on a lower surface of the solid electrolyte layer 18 so as to be opposite to the positive-electrode active material layer 22, and containing TiO and $SiO_x$ as a negative-electrode active material. Moreover, the metallic oxide-containing buffer layer 19MO ($SiO_x$+SnO) for improving the interface is inserted between the positive-electrode active material layer 22 and the solid electrolyte layer 18.

FIG. 8D illustrates the structure 4 (working example) of the secondary battery 30 (corresponding to the structure illustrated in FIG. 3B). The structure 4 includes: a solid electrolyte layer 18 containing $Ta_2O_5$ as a solid electrolyte; a positive-electrode active material layer 22 disposed on an upper surface of the solid electrolyte layer 18 and containing $Ni(OH)_2$ as a positive-electrode active material; and a negative-electrode active material layer 16S disposed on a lower surface of the solid electrolyte layer 18 so as to be opposite to the positive-electrode active material layer 22, and containing TiO and $SiO_x$ as a negative-electrode active material. The buffer layer 19 ($SiO_x$) for improving the interface is inserted between the positive-electrode active material layer 22 and the solid electrolyte layer 18.

FIG. 8E illustrates the structure 5 (working example) of the secondary battery 30 (corresponding to the structure illustrated in FIG. 3A). The structure 5 includes: a solid electrolyte layer 18 containing $Ta_2O_5$ as a solid electrolyte; a positive-electrode active material layer 22 disposed on an upper surface of the solid electrolyte layer 18SS and containing $Ni(OH)_2$ as a positive-electrode active material; and a negative-electrode active material layer 16 disposed on a lower surface of the solid electrolyte layer 18 so as to be opposite to the positive-electrode active material layer 22, and containing $TiO_x$ as a negative-electrode active material. The buffer layer 19 ($SiO_x$) for improving the interface is inserted between the positive-electrode active material layer 22 and the solid electrolyte layer 18.

FIG. 8F illustrates the structure 6 (comparative example) of the secondary battery 30. The structure 6 includes: a solid electrolyte layer 18SS containing $SiO_x$ and SnO as a solid electrolyte; a positive-electrode active material layer 22 disposed on an upper surface of the solid electrolyte layer 18SS and containing $Ni(OH)_2$ as a positive-electrode active material; and a negative-electrode active material layer 16 disposed on a lower surface of the solid electrolyte layer 18 so as to be opposite to the positive-electrode active material layer 22, and containing $TiO_x$ as a negative-electrode active material.

The tantalum oxide used for the solid electrolyte layer 18 illustrated in each of FIGS. 8B to 8E is a dielectric containing an appropriate amount of water as a hydrate, and it is considered that ionic conductivity higher than that of the ($SiO_x$+SnO) used for the solid electrolyte layer 18SS illustrated in each of FIGS. 8A and 8F can be obtained. On the other hand, it is considered that a hydrous film is required in order to change the characteristics of the electron conductivity and the ionic conductivity characteristics by increasing and decreasing the water content. Since the amount of the water content is increased with higher pressure during a sputtering process, the solid electrolyte layer 18 illustrated in each of FIGS. 8B to 8E is formed by performing the sputtering process at high pressure (approximately 2.4 Pa). As a result, the amount of hydrogen in the $Ta_2O_5$ layer used for the formed solid electrolyte layer 18 is approximately 36%. $Ta_2O_{4.6}$ is contained in the tantalum oxide film used for the solid electrolyte layer 18 to be applied to the embodiments from a result of X-ray Reflectivity (XRR), and as an example of the hydrous property, H concentration equivalent to that of the $SiO_x$+SnO is verified from a result of a Secondary Ion Mass Spectrometry (SIMS).

Moreover, the $SiO_x$ can be formed as a film with a sol-gel method or the like using a tetraethyl orthosilicate (TEOS) as a material.

The $Ta_2O_5$ layers used for the solid electrolyte layer 18 are compared with one another to be formed by sputtering and ion plating under different film formation conditions. From the film formation conditions, charge and discharge has been verified within an appropriate range of an oxygen flow rate, gas pressure, and an electric power during the film formation. The film formation conditions for this sputtering deposition targeting the $Ta_2O_5$ are as follows: the $O_2$ flow rate is 1% of the Ar flow rate, and the electric power during the film formation is 3.19 $W/cm^2$.

Furthermore, it is considered that an interface resistance in the interface between the solid electrolyte layer 18 and the negative-electrode active material layer 16 is higher than the solid electrolyte ($SiO_x$+SnO) used for the solid electrolyte layer 18SS illustrated in FIGS. 8A and 8F merely by inserting the $Ta_2O_5$ into the secondary battery 30, resulting in a smaller discharge capacity. Hereinafter, a relationship between the interface resistance and the discharge capacity will now be considered.

Figure 9A:
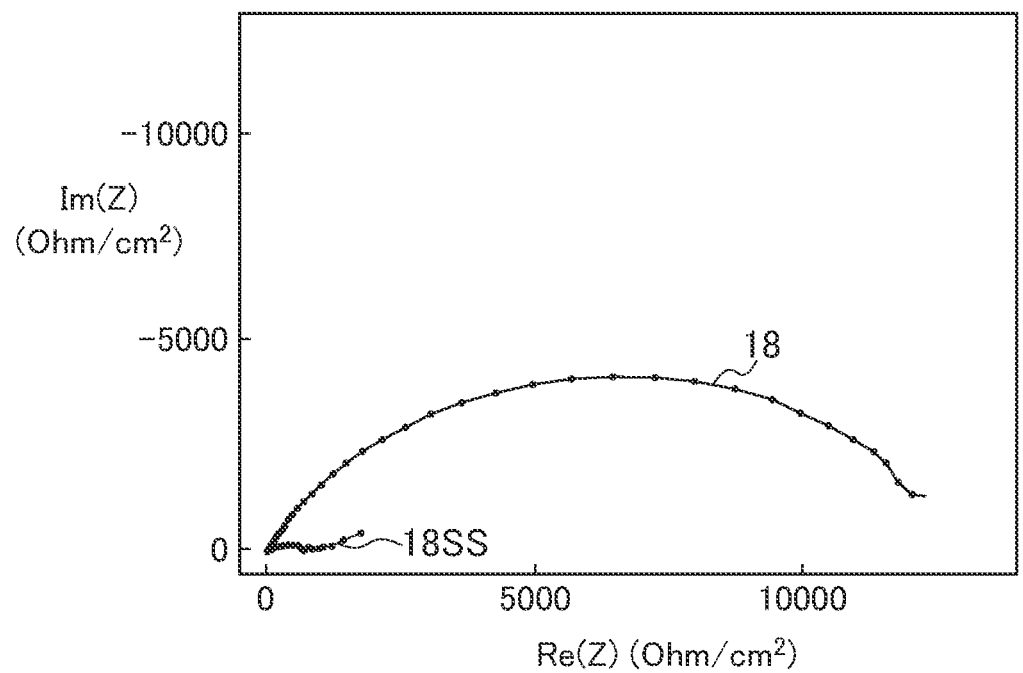
FIG. 9A illustrates a diagram illustrating an example of data of a resistance value of each solid electrolyte layer obtained by an electrochemical impedance measurement (comparison between the structure 1 (comparative example) and the structure 2 (working example)).
Figure 9B:
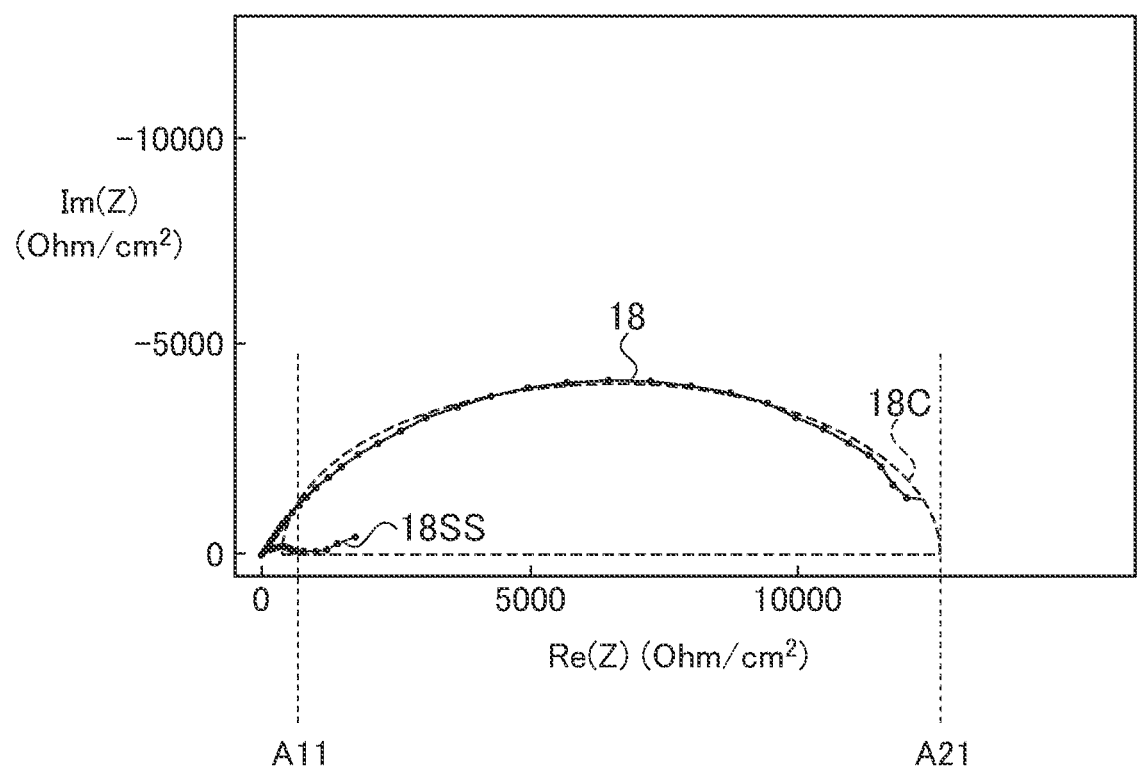
FIG. 9B illustrates an explanatory diagram of an arc portion of the graphic curve illustrated in FIG. 9A.

FIG. 9A illustrates a comparison between Nyquist plot of the solid electrolyte layer 18SS in the structure 1 (comparative example) and Nyquist plot of the solid electrolyte layer 18 in the structure 2 (working example) made by electrochemical impedance measurement, and FIG. 9B is an explanatory diagram to which an arc portion of the graphic curve illustrated in FIG. 9A added.

As is clear from FIG. 9, the arc 18C of the solid electrolyte layer 18 ($Ta_2O_5$) is larger than the arc of the solid electrolyte layer 18SS ($SiO_x$+SnO), and if assuming that the arc portion corresponds to a part containing the solid electrolyte, the resistance value A11 of the solid electrolyte layer 18SS ($SiO_x$+SnO) is low rather than the resistance value A21 of the solid electrolyte layer 18 ($Ta_2O_5$). As a specific value in FIG. 9, for example, while the resistance value A11 of the solid electrolyte layer 18SS ($SiO_x$+SnO) is approximately 670Ω, the resistance value A21 of the solid electrolyte layer 18 ($Ta_2O_5$) is approximately 13000Ω, which is more than 19 times higher.

On the other hand, in the structure where the $Ta_2O_5$ is inserted into the secondary battery 30, it is assumed that since the ionic conductivity of the $Ta_2O_5$ is high but the discharge capacity thereof is small, the interface resistance between the solid electrolyte layer 18 and the positive-electrode active material layer 22 and the interface resistance between the solid electrolyte layer 18 and the negative-electrode active material layer 16 assume are high. Accordingly, an evaluation is performed by inserting the $SiO_x$ as a buffer layer 19 between the solid electrolyte layer 18 and the positive-electrode active material layer 22 in order to change a state of the interface therebetween.

As a result of the evaluation performed by inserting the buffer layer ($SiO_x$) into the interface between the solid electrolyte layer 18 and the positive-electrode active material layer 22, an improvement in the charge/discharge characteristics is found. Moreover, also as a result of performing the electrochemical impedance measurement, reduction in the internal electrical resistance is verified at both the $Ta_2O_5/SiO_x$ structure (FIG. 3) and the $Ta_2O_5/(SiO_x+SnO)$ structure (FIG. 6). The ionic conductivity in each structure is equivalent to the ionic conductivity of the solid electrolyte layer 18SS ($SiO_x$+SnO).

Figure 10A:
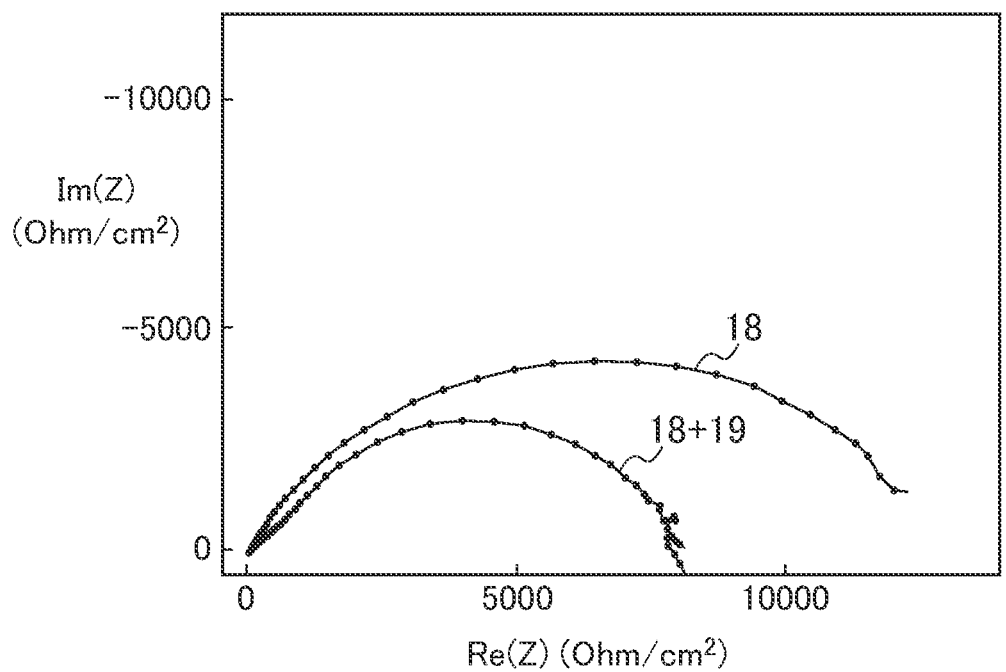
FIG. 10A illustrates a diagram illustrating an example of data of a resistance value of each solid electrolyte layer obtained by the electrochemical impedance measurement (comparison between the structure 2 (working example) and the structure 4 (working example)).
Figure 10B:
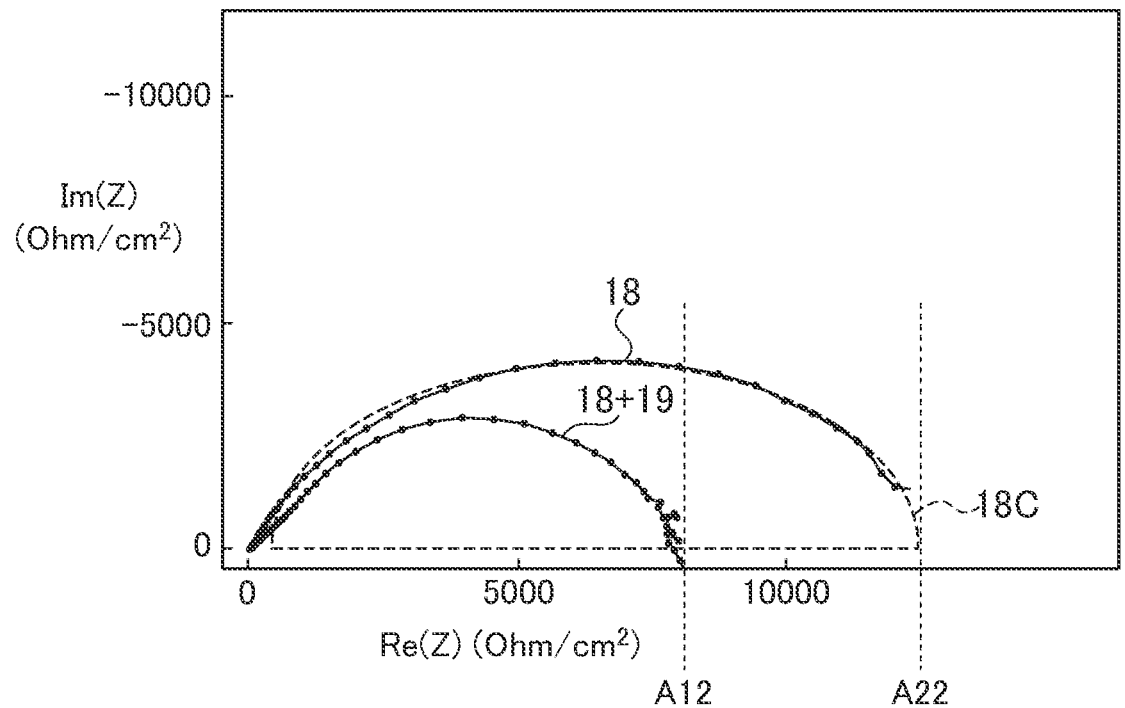
FIG. 10B illustrates an explanatory diagram of an arc portion of the graphic curve illustrated in FIG. 10A.

FIG. 10A illustrates a comparison between the resistance value of the solid electrolyte layer 18 (no buffer layer is inserted) in the structure 2 (working example) and the resistance value of the solid electrolyte layer 18+the buffer layer 19 (the $SiO_x$ is inserted as the buffer layer 19 between the positive-electrode active material layers 22 and the solid electrolyte layer 18) in the structure 4 (working example) made by the electrochemical impedance measurement. FIG. 10B is an explanatory diagram of plotted arc portion (Nyquist plots) of the graphic curve illustrated in FIG. 10A.

As is clear from FIG. 10, the arc 18C of the solid electrolyte layer 18 ($Ta_2O_5$) in the structure 2 is larger than the arc of the solid electrolyte layer 18+the buffer layer 19 ($Ta_2O_5/SiO_x$) in the structure 4, and if assuming that the arc portion corresponds to a part containing the solid electrolyte, the resistance value of the solid electrolyte layer+the buffer layer (18+19) ($Ta_2O_5/SiO_x$) in the structure 4 is low than that of the solid electrolyte layer 18 ($Ta_2O_5$) in the structure 2. As a specific value in FIG. 10, for example, while the resistance value A12 of the solid electrolyte layer 18+the buffer layer 19 ($Ta_2O_5/SiO_x$) is approximately 8000Ω, the resistance value A22 of the solid electrolyte layer 18 ($Ta_2O_5$) is around approximately 13000Ω.

Figures 11, 12:
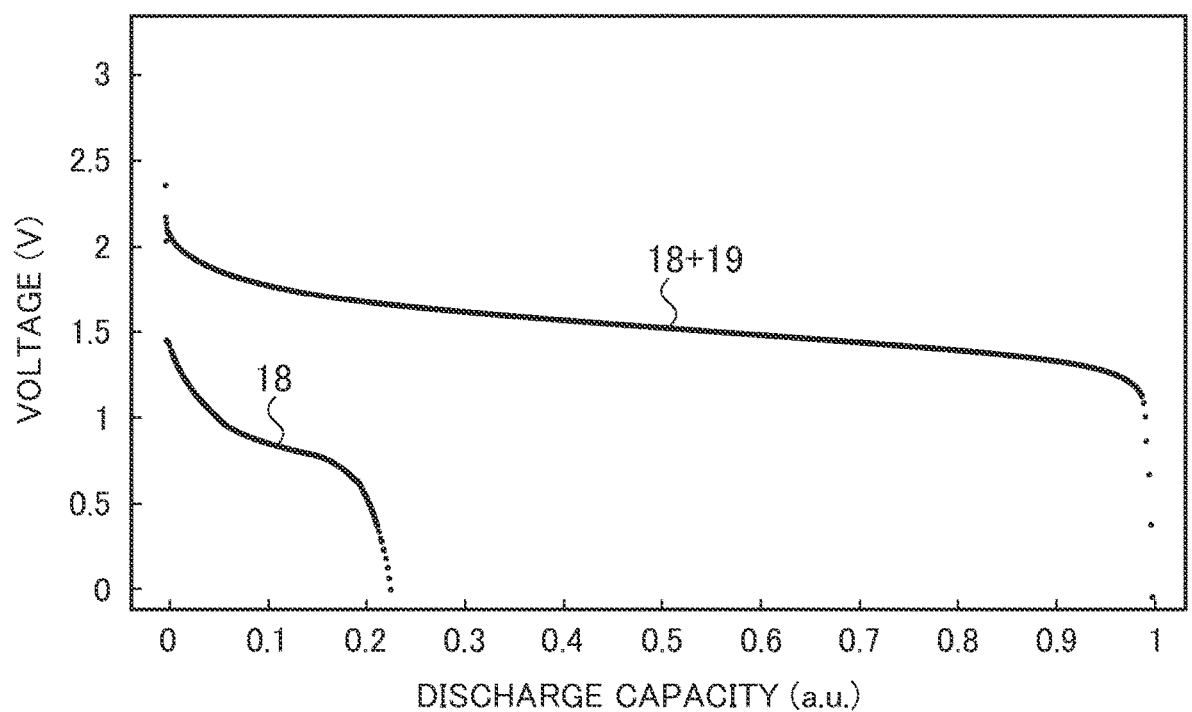
FIG. 11 illustrates a diagram illustrating an example of data of a resistance value in a single film ($SiO_2$, $Al_2O_3$, $SiO_x+SnO$, $Ta_2O_5$, $Ta_2O_5/SiO_x$) of each solid electrolyte layer obtained by the electrochemical impedance measurement.
FIG. 12 illustrates a diagram illustrating an example of discharge characteristics (discharge curve) of each secondary battery of the structure 2 and the structure 4.

FIG. 11 illustrates a data example of ionic conductivity in a single film of the solid electrolyte layer ($SiO_2$, $Al_2O_3$, ($SiO_x$+SnO), $Ta_2O_5$, and $Ta_2O_5/SiO_x$) made by electrochemical impedance measurement. It proves that the ionic conductivity of $Ta_2O_5$ is relatively high. FIG. 12 illustrates an example (comparison between the structure 2 and the structure 4) of the discharge characteristics (discharge curve) of the secondary battery 30 in each of the structure 2 and the structure 4.

FIG. 12 illustrates an example of improved characteristics to which example of differences in charge/discharge characteristics is added. Reduction in the resistance can be verified also from the discharge characteristics (discharge curve) illustrated in FIG. 12. This proves that the resistance is decreased by inserting the buffer layer 19 ($SiO_x$) into the interface between the solid electrolyte layer 18 ($Ta_2O_5$) and the positive-electrode active material layer 22 ($Ni(OH)_2$). More specifically in the discharge curve of FIG. 12, this is because the discharge start voltage in the structure 4 ($Ta_2O_5/SiO_x$ structure) is higher than the discharge start voltage in the structure 2. This is because the larger the resistance value, the larger the drop at the start of discharge, and the discharge starts at a lower voltage.

FIG. 13 is a diagram illustrating an example of a self-discharge residual rate for a structure of the secondary battery 30 of in each of the structures 1 to 4.

As illustrated in FIG. 13, when an effect of the self-discharge is verified, significant improvement can be observed in the structure 3 ($Ta_2O_5/(SiO_x+SnO)$ structure) and in the structure 4 ($Ta_2O_5+SiO_x$ structure) more than that in the structure 1 ($SiO_x$+SnO) which is the comparative example. Specifically, as illustrated in FIG. 13, while the self-discharge residual rate after certain period of time leaving is approximately 10% in the structure 1, it is improved to approximately 33% in the structure 3 and is improved to approximately 60% in the structure 4.

Next, it verifies also the discharge capacity and the self-discharge residual rate at a negative electrode side.

FIG. 14 illustrates an example (comparison) of the discharge capacity and the self-discharge residual rate for a structure of the secondary battery 30 in each of the structures 4, 5, 1, and 6. Each negative-electrode active material is based on a titanium oxide ($TiO_x$). The structure 4 is a structure in which $SiO_x$ is inserted as the buffer layer 19 between the solid electrolyte layer 18 ($Ta_2O_5$) and the positive-electrode active material layer 22, and thereby the negative-electrode active material of the negative-electrode active material layer 16S is $TiO_x+SiO_x$. The structure 5 is a structure in which only the solid electrolyte layer 18 ($Ta_2O_5$) is used without inserting the buffer layer 19 between the solid electrolyte layer 18 and the positive-electrode active material layer 22. Comparing between the structure 4 and the structure 5 with each other, the discharge capacity of the former is higher than the discharge capacity of the latter. In the case of the comparative examples, the structure 1 and the structure 6 (structure where the solid electrolyte is $SiO_x$+SnO), such a phenomenon is not observed.

The improvement in the self-discharge is observed by providing the $SiO_x$ at the positive electrode side and/or the negative electrode side of the solid electrolyte layer 18 ($Ta_2O_5$), without deteriorating the discharge capacity.

Although each interface cannot be separated in accordance with the Nyquist plots of the electrochemical impedance measurements illustrated in FIGS. 9 to 10, it is considered that the interface resistance between the solid electrolyte layer 18 and the positive-electrode active material layer 22 can be decreased by inserting the buffer layer 19 of $SiO_x$ between the solid electrolyte layer 18 and the positive-electrode active material layer 22, on the basis of a series of the experimental results.

Figure 15A:
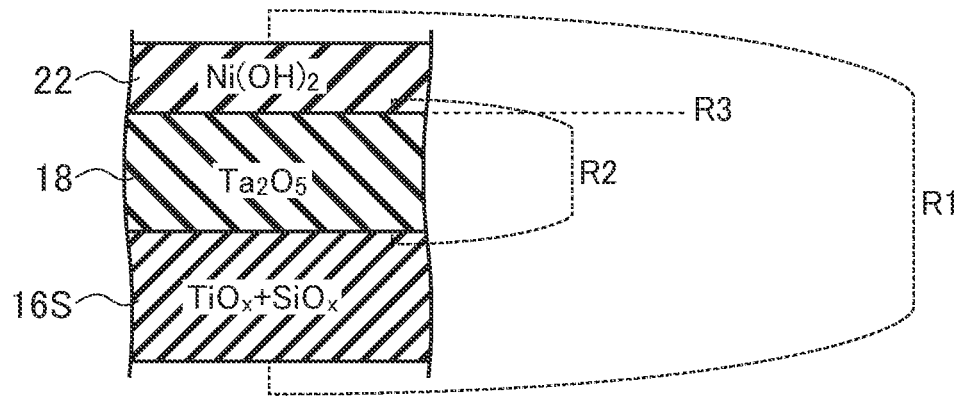
FIG. 15A illustrates, in an example of a resistance value in the single film and a resistance value as a battery, an example of the structure 2 (working example).
Figure 15B:
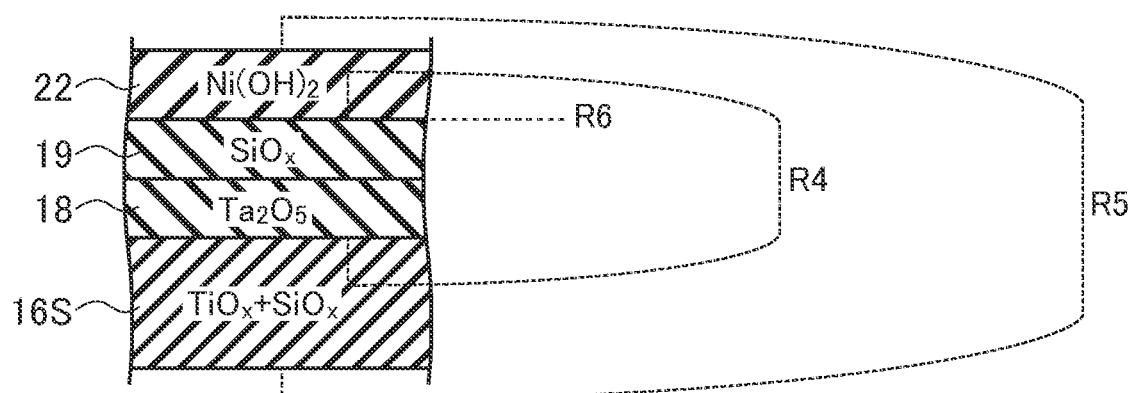
FIG. 15B illustrates, in an example of a resistance value in the single film and a resistance value as a battery, an example of the structure 4 (working example).

FIG. 15 illustrates an example of a resistance component of the secondary battery 30. FIG. 15A illustrates an example of the structure 2, and FIG. 15B illustrates an example of the structure 4.

The resistance value R2 of only the solid electrolyte layer 18 ($Ta_2O_5$) (without buffer layer) in the structure 2 is lower than the resistance value R4 of the solid electrolyte layer 18 ($Ta_2O_5/SiO_x$) with the inserted buffer layer 19 in the structure 4. For example, in FIG. 15, the resistance value R2 is approximately 33Ω (3.0E-6 [S/cm]), and the resistance value R4 is approximately 255Ω (2.0E-7 [S/cm]).

However, if viewed as the secondary battery 30, a tendency thereof is reversed, and the resistance value R5 in the structure 4 is lower than the resistance value R1 in the structure 2. For example, in FIG. 15, the resistance value R5 is approximately 250Ω, and the resistance value R1 is approximately 1600Ω (the resistance values R5 and R1 are derived from the Nyquist plots illustrated in FIG. 9).

The reason for this reversal of the tendency thereof is presumably because the interface resistance R3 between the solid electrolyte layer 18 and the positive-electrode active material layer 22 in the structure 2 is close to R1, while the interface resistance R6 between the buffer layer 19 and the positive-electrode active material layer 22 in the structure 4 is negligibly small compared to R5.

Accordingly, it can be considered that the interface resistance between the solid electrolyte layer 18 and the positive-electrode active material layer 22 can be decreased by inserting the buffer layer 19 of $SiO_x$ between the solid electrolyte layer 18 and the positive-electrode active material layer 22.

Second Embodiment

Figure 16:
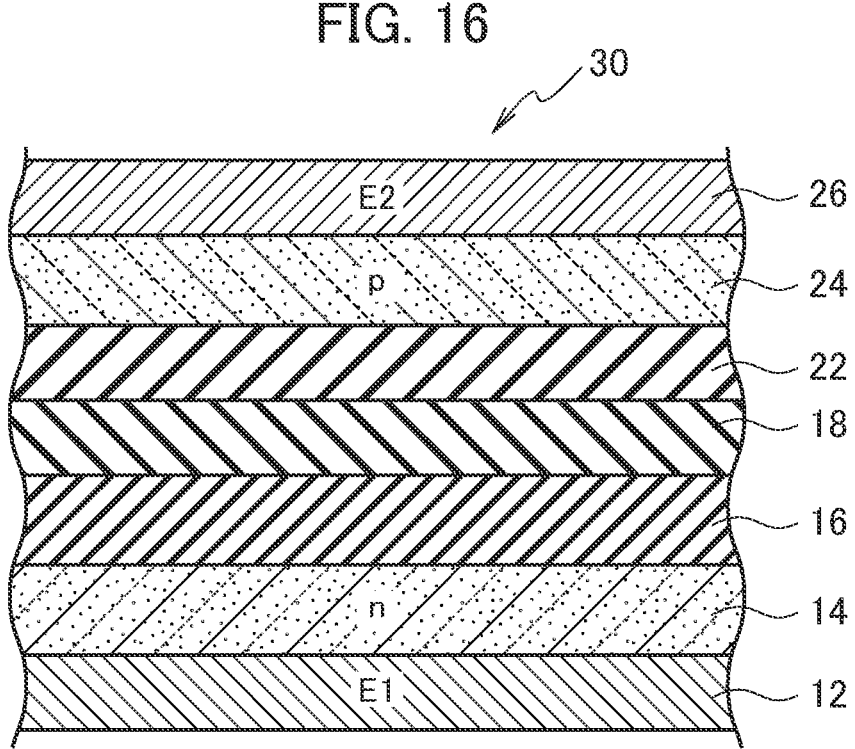
FIG. 16 illustrates a schematic cross-sectional structure diagram illustrating a secondary battery according to a second embodiment.

FIG. 16 illustrates a schematic cross-sectional structure of a secondary battery 30 according to a second embodiment. The secondary battery 30 includes a configuration including a first electrode (E1) (negative electrode) 12/a negative-electrode active material layer 16/a solid electrolyte layer 18/a positive-electrode active material layer 22/a p type semiconductor layer 24/a second electrode (E2) (positive electrode) 26.

The secondary battery 30 according to the second embodiment has a structure of inserting the p type semiconductor layer 24 on the positive-electrode active material layer 22.

As illustrated in FIG. 16, the secondary battery 30 according to the second embodiment includes the p type semiconductor layer 24 disposed between the positive-electrode active material layer and the second electrode (positive electrode).

The p type semiconductor layer 24 functions as a conductive hole transport layer and may include a nickel oxide (NiO) which, for example, having a crystal structure. Other configurations are the same as those of the first embodiment.

Third Embodiment

Figure 17:
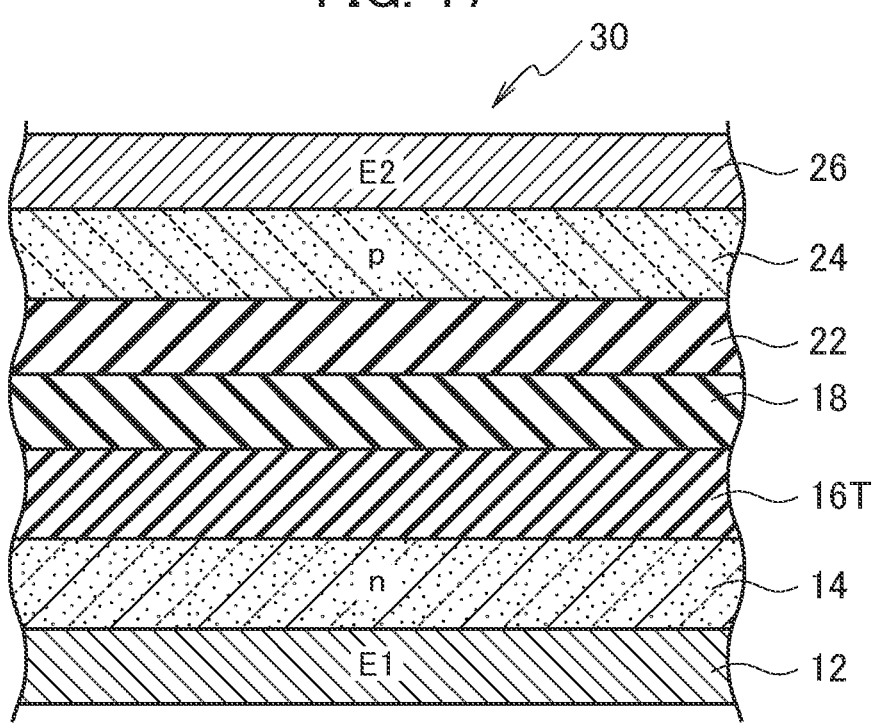
FIG. 17 illustrates a schematic cross-sectional structure diagram illustrating a secondary battery according to a third embodiment.

FIG. 17 illustrates a schematic cross-sectional structure of a secondary battery 30 according to a third embodiment. The secondary battery 30 according to the third embodiment includes a configuration including a first electrode (E1) (negative electrode) 12/an n type semiconductor layer 14/a negative-electrode active material layer 16T/a solid electrolyte layer 18/a positive-electrode active material layer 22/a p type semiconductor layer 24/a second electrode (E2) (positive electrode) 26. The difference from the second embodiment is a point that the negative-electrode active material layer 16T has a titanium oxide compound ($TiO_x$) but does not have a silicon oxide.

The p type semiconductor layer 24 functions as a conductive hole transport Layer, and may have a nickel oxide (NiO), for example. Other configurations are the same as those of the second embodiment.

In addition, the secondary battery 30 according to the embodiment illustrated in each of FIGS. 2 to 15 can be applied to the second or third embodiment as well as the first embodiment.

As described above, according to the first to third embodiments, there can be provided the secondary battery capable of improving the electricity storage performance by improving the self-discharge.

Moreover, it is possible to control and adjust the layer thickness by applying the layer having high ionic conductivity, and improvement in cycle characteristics and fabricating stability can also be expected.

Other Embodiments

As explained above, the embodiments have been described, as a disclosure including associated description and drawings to be construed as illustrative, not restrictive. It will be apparent to those skilled in the art from the disclosure that various alternative embodiments, examples and implementations can be made.

Such being the case, the embodiments cover a variety of embodiments, whether described or not.

INDUSTRIAL APPLICABILITY

The secondary battery of the embodiments can be utilized for various consumer equipment and industrial equipment, and can be applied to wide applicable fields, such as secondary batteries for system applications capable of transmitting various kinds of sensor information with low power consumption, e.g., communication terminals and secondary batteries for wireless sensor networks.

What is claimed is:

1. A secondary battery comprising:
   a solid electrolyte layer containing a tantalum oxide as a solid electrolyte;
   a positive-electrode active material layer disposed on an upper surface of the solid electrolyte layer, the positive-electrode active material layer containing nickel hydroxide ($Ni(OH)_2$) as a positive-electrode active material;
   a negative-electrode active material layer disposed on a lower surface of the solid electrolyte layer so as to be opposite to the positive-electrode active material layer, the negative-electrode active material layer containing a titanium oxide or containing a titanium oxide and a silicon oxide as a negative-electrode active material; and
   a buffer layer for improving an interface formed between the positive-electrode active material layer and the solid electrolyte layer or between the negative-electrode active material layer and the solid electrolyte layer, wherein the buffer layer contains a metal oxide selected from the group consisting of a tin oxide (SnO), aluminum oxide ($Al_2O_3$), zirconia ($ZrO_2$), and magnesium oxide (MgO);
   wherein the titanium oxide comprises a micro crystalline structure.

2. The secondary battery according to claim 1, wherein the tantalum oxide comprises $Ta_2O_x$ (where x=4-5).

3. The secondary battery according to claim 1, further comprising:
   a second electrode disposed on an upper surface of the positive-electrode active material layer; and
   a first electrode disposed on a lower surface of the negative-electrode active material layer so as to be opposite to the second electrode.

4. The secondary battery according to claim 3, further comprising a p type oxide semiconductor layer formed between the positive-electrode active material layer and the second electrode.

5. The secondary battery according to claim 4, wherein the p type oxide semiconductor layer is composed of a nickel oxide having a crystal structure.

6. The secondary battery according to claim 5, further comprising an n type oxide semiconductor layer formed between the negative-electrode active material layer and the first electrode.

7. The secondary battery according to claim 6, wherein the n type oxide semiconductor layer is composed of a titanium oxide, the titanium oxide including at least one crystal structure selected from the group consisting of a rutile type crystal structure and an anatase type crystal structure.

8. The secondary battery according to claim 1, wherein the titanium oxide comprises an amorphous structure.

9. The secondary battery according to claim 1, wherein the buffer layer contains tin oxide (SnO).

10. The secondary battery according to claim 1, wherein the buffer layer contains aluminum oxide ($Al_2O_3$).

11. The secondary battery according to claim 1, wherein the buffer layer contains zirconia ($ZrO_2$).

12. The secondary battery according to claim 1, wherein the buffer layer contains magnesium oxide (MgO).

* * * * *